(12) United States Patent
Maclin

(10) Patent No.: US 12,735,022 B2
(45) Date of Patent: Sep. 15, 2026

(54) TRAVEL DISTANCE EXTENDER FOR ELECTRIC VEHICLES

(71) Applicant: Reginald V Maclin, St. Peters, MO (US)

(72) Inventor: Reginald V Maclin, St. Peters, MO (US)

( * ) Notice: Subject to any disclaimer, the term of this patent is extended or adjusted under 35 U.S.C. 154(b) by 74 days.

(21) Appl. No.: 17/962,514

(22) Filed: Oct. 9, 2022

(65) Prior Publication Data

US 2024/0116490 A1 Apr. 11, 2024

(51) Int. Cl.
*B60L 53/24* (2019.01)
*B60L 50/75* (2019.01)
*B60L 50/90* (2019.01)
*B60W 20/12* (2016.01)

(52) U.S. Cl.
CPC ............ *B60W 20/12* (2016.01); *B60L 53/24* (2019.02); *B60W 2510/081* (2013.01)

(58) Field of Classification Search
CPC . B60W 20/12; B60W 2510/081; B60L 53/24; B60L 50/40; B60L 50/75; B60L 50/90
USPC ........................................................ 701/1, 22
See application file for complete search history.

(56) References Cited

U.S. PATENT DOCUMENTS 3,826,985 A * 7/1974 Wiley .................. G01P 3/4802 324/173
4,127,812 A * 11/1978 Baliguet ............... G01P 3/4805 324/174
5,023,546 A * 6/1991 Pawlak ................... G01P 3/488 310/155
5,032,790 A * 7/1991 Johnson .................. G01P 1/026 324/207.16
5,121,998 A * 6/1992 Bhatia ................... F16C 19/386 384/585
5,123,755 A * 6/1992 Faye ....................... G01P 3/446 310/168
5,129,742 A * 7/1992 Tilch ..................... F16C 33/583 384/446
5,214,722 A * 5/1993 Faye ....................... G01P 3/446 310/168
5,384,534 A * 1/1995 Bjork ...................... G01P 3/488 324/160
5,434,503 A * 7/1995 Rigaux ................. F16C 41/007 324/207.25

(Continued)

OTHER PUBLICATIONS

Parthasarathy D., Energy harvesting wheel speed sensor, 2012, Master thesis, Chalmers University of Technology, Department of Microtechnology and Nanoscience, Göteborg, Sweden, pp. 1-102. (Year: 2012).*

(Continued)

*Primary Examiner* — Jaime Figueroa
(74) *Attorney, Agent, or Firm* — Edison Law Group, PLLC

(57) ABSTRACT

One exemplary system includes at least one speed sensor for generating electrical power, wherein the at least one speed sensor is operatively coupled to a vehicle drivetrain of an electric vehicle; and an energy storage module, operatively coupled to the at least one speed sensor, for storing at least a portion of the electrical power generated by the at least one speed sensor; wherein the at least a portion of the electrical power is used to power the electric vehicle.

24 Claims, 2 Drawing Sheets

(56) References Cited

U.S. PATENT DOCUMENTS 5,469,058 A * 11/1995 Dunnam .............. G01R 33/028 324/258
5,486,758 A * 1/1996 Hammerle ........... G01D 5/2006 324/173
5,493,214 A * 2/1996 Good ....................... G01D 3/08 324/225
5,624,192 A * 4/1997 Rigaux ................... G01P 3/446 384/446
5,625,272 A * 4/1997 Takahashi ............... B60L 53/00 320/160
5,635,820 A * 6/1997 Park .......................... H02J 7/94 320/152
5,898,388 A * 4/1999 Hofmann ................ G01P 3/481 340/870.31
5,938,346 A * 8/1999 Ouchi ..................... G01P 3/443 384/448
6,098,469 A * 8/2000 Nicot .................... F16C 19/522 73/862.55
6,109,793 A * 8/2000 Miyazaki ................ G01P 3/488 384/448
6,190,051 B1 * 2/2001 Angelo ............... F16C 33/7886 384/445
6,323,640 B1 * 11/2001 Forestiero ............... G01P 3/443 324/207.25
6,328,476 B2 * 12/2001 Nakamura ............ F16C 41/007 324/207.25
6,352,370 B1 * 3/2002 Nicot ...................... G01P 3/443 384/448
6,435,724 B1 * 8/2002 Louzon ................... G01P 3/443 477/154
6,538,427 B1 * 3/2003 Silvasi .................... G01P 3/443 324/207.25
6,830,379 B2 * 12/2004 Morita .................. B60C 23/042 384/448
7,362,023 B2 * 4/2008 Mizutani ............... F16C 41/008 310/90
8,092,338 B2 1/2012 Masfaraud
8,360,533 B2 1/2013 Kim
9,103,846 B2 * 8/2015 Mock .................... F16C 41/004
10,323,962 B2 * 6/2019 Grambichler .......... G01D 5/247
11,511,688 B2 * 11/2022 Lee ....................... B60R 16/033
2003/0093188 A1 * 5/2003 Morita ................ B60C 23/0408 701/1
2004/0035656 A1 * 2/2004 Anwar .................. B60T 13/586 188/161
2004/0150516 A1 * 8/2004 Faetanini ............... G01D 21/00 340/444
2005/0150281 A1 * 7/2005 Schroeder ............. G01D 5/145 73/114.26
2006/0033642 A1 * 2/2006 Calderone ............... G01S 13/60 340/936
2006/0213703 A1 9/2006 Long
2008/0303513 A1 * 12/2008 Turner .................... G01P 3/488 324/160
2009/0051349 A1 * 2/2009 Fruehling ........... F16C 33/7859 324/173
2011/0018526 A1 * 1/2011 Windmueller .......... G01P 3/488 324/176
2012/0200289 A1 * 8/2012 Mock .................... F16C 41/007 324/238
2013/0234629 A1 * 9/2013 Seol .......................... B60L 7/16 318/139
2017/0241812 A1 * 8/2017 Grambichler .......... G01D 5/247

OTHER PUBLICATIONS

Parthasarathy, Dhasarathy, Peter Enoksson, and Roy Johansson. “Prototype energy harvesting wheel speed sensor for anti-lock braking.” In 2012 IEEE International Symposium on Robotic and Sensors Environments Proceedings, pp. 115-120. DOI: 10.1109/ROSE.2012.6402607 (Year: 2012).*

K. Gintner, “Rotationally Symmetrical Speed Sensor with Detection of Direction of Rotation,” Sensors and Measuring Systems; 21th ITG/GMA-Symposium, Nuremberg, Germany, 2022, pp. 1-3. (Year: 2022).* https://en.wikipedia.org/wiki/Range_extender.

https://www.amazon.com/T-king-Generator-Automatic-Frequency-Conversion/dp/B07VFDPBJY.

https://www.autoexpress.co.uk/tips-advice/353643/regenerative-braking-what-it-and-how-does-it-work.

“A Comparative Research on the Energy Recovery Potential of Different Vehicle Energy Regeneration Technologies”.

* cited by examiner

TRAVEL DISTANCE EXTENDER FOR ELECTRIC VEHICLES

BACKGROUND

The present invention relates to a travel distance extender for electric vehicles. Motor vehicles that are driven by electric machines are being developed and manufactured by the automotive industry in ever-increasing numbers. Power for operating the electric machine to drive the electric vehicle originates from a battery situated in the electric vehicle. The battery can be recharged by a power supply and/or charger when the electric vehicle is stationary and located proximate to a charging station. The electric vehicle may include an on-board battery charging unit for this purpose. The battery's capacity for storing electrical power is limited, such that a typical electric vehicle is able to achieve a maximum travel distance of only approximately 50 km to 200 km before the battery requires charging. Accordingly, what is needed is an improved mechanism that extends the travel distance of the electric vehicle.

SUMMARY

One example embodiment provides a system that includes at least one speed sensor for generating electrical power, wherein the at least one speed sensor is operatively coupled to a vehicle drivetrain of an electric vehicle; and an energy storage module, operatively coupled to the at least one speed sensor, for storing at least a portion of the electrical power generated by the at least one speed sensor; wherein the at least a portion of the electrical power is used to power the electric vehicle.

Another example embodiment provides a method that includes generating electrical power from at least one speed sensor operatively coupled to a vehicle drivetrain of an electric vehicle, storing at least a portion of the generated electrical power in an energy storage module, and using the stored electrical power to power the electric vehicle.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figure, is not intended to limit the scope of the application as claimed but is merely representative of selected embodiments. Multiple embodiments depicted herein are not intended to limit the scope of the solution.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one example. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow.

Figure 1:
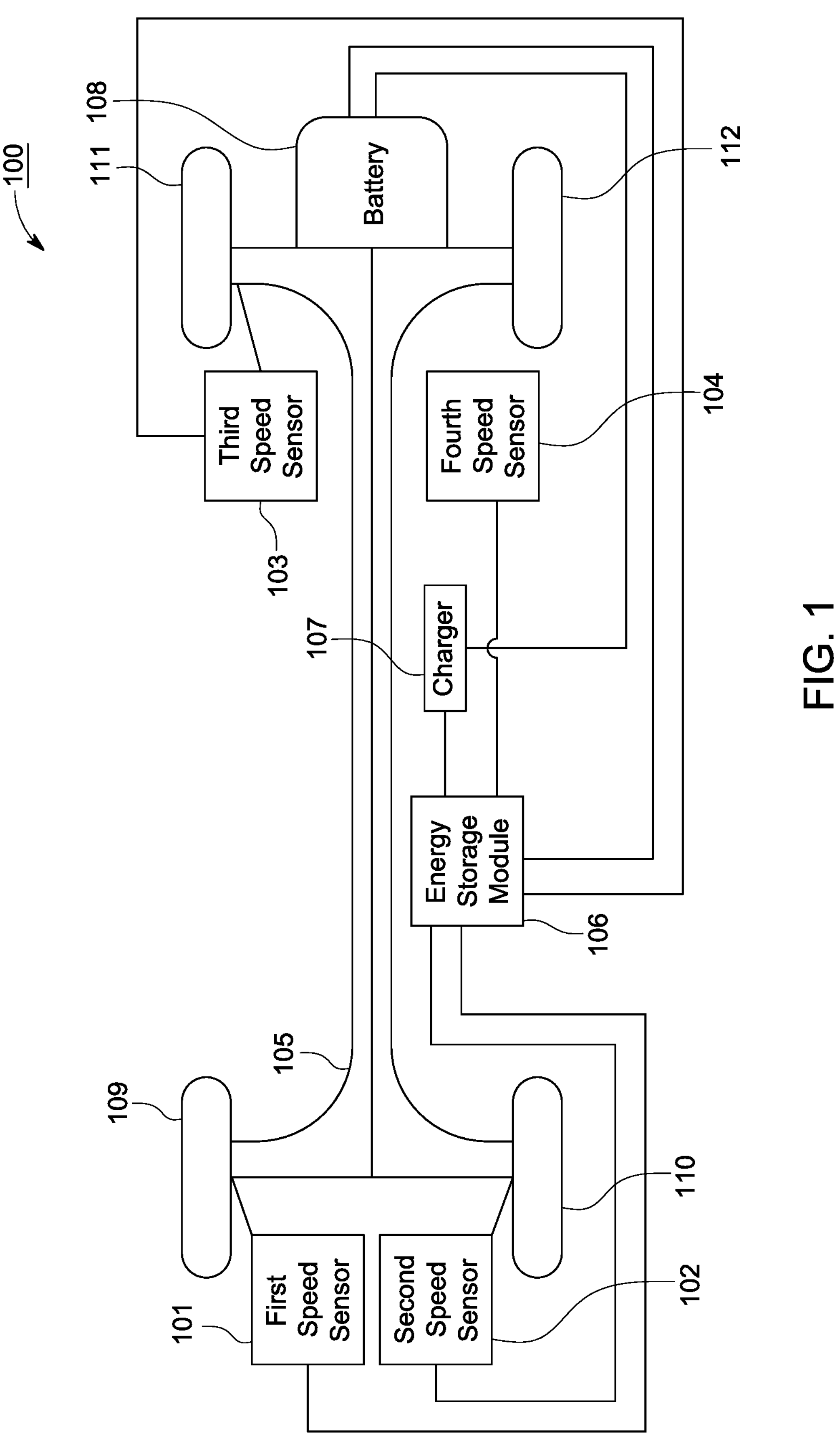
FIG. 1 illustrates an example system diagram, according to example embodiments.

FIG. 1 illustrates a system diagram 100, in one set of embodiments. The system diagram 100 depicts a vehicle drivetrain 105 of an electric vehicle. The vehicle drivetrain 105 includes a group of components of the electric vehicle that deliver torque to one or more drive wheels of the electric vehicle, such as at least one of a first wheel 109, a second wheel 110, a third wheel 111, and/or a fourth wheel 111. At least one speed sensor, such as a first speed sensor 101, a second speed sensor 102, a third speed sensor 103, and/or a fourth speed sensor 104, are operatively coupled to the vehicle drivetrain 105. The first speed sensor 101 generates electrical power in response to a rotation of the first wheel 109, the second speed sensor 102 generates electrical power in response to a rotation of the second wheel 110, the third speed sensor 103 generates electrical power in response to a rotation of the third wheel 111, and the fourth speed sensor 104 generates electrical power in response to a rotation of the fourth wheel 112.

In some embodiments, the at least one speed sensor may comprise a ferromagnetic toothed reluctor ring (tone wheel), and configured to perform active sensing and/or passive sensing. The tone wheel can be made of steel and may be of an open-air design, or sealed (as in the case of unitized bearing assemblies). The number of teeth can be chosen as a trade-off between low-speed sensing/accuracy and high-speed sensing/cost. Greater numbers of teeth may require more machining operations, and in the case of passive sensing, may produce a higher-frequency alternating current (AC) output signal which may not be as easily interpreted at the receiving end, but provide a better resolution and higher signal update rate as compared to a lower-frequency AC output signal. In more advanced systems, the teeth can be asymmetrically-shaped to allow the sensor to distinguish between forward and reverse rotation of a corresponding wheel, such as the first, second, third, and/or fourth wheels 109, 110, 111, 112.

In some embodiments, the at least one speed sensor is a passive sensor. The passive sensor includes a ferromagnetic rod which is oriented to project radially from the tone wheel, with a permanent magnet at the opposite end. The rod may be wound with wire to form one or more coils, wherein the one or more coils experience an induced alternating voltage as the tone wheel rotates, with the teeth periodically interfering with a magnetic field produced by the permanent magnet. Passive sensors can be configured to output electrical power in the form of a sinusoidal output signal which grows in magnitude and frequency with wheel speed.

In some embodiments, a variation of the passive sensor does not have a magnet backing it, but rather a tone wheel which includes alternating magnetic poles to produce an alternating output voltage. The output signal of this sensor may resemble a square wave, rather than a sinusoid, but the output signal still increases in magnitude as wheels speed increases.

In some embodiments, the at least one speed sensor is an active sensor. The active sensor can be a passive sensor with output signal conditioning circuitry built into the device. The signal conditioning may be performed by amplifying a magnitude of the output signal, changing the form of the output signal to a series of pulses (for example, pulse-width modulation (PWM) pulses), a square wave, or any of various other waveforms; or encoding the output signal using a communications protocol.

In some embodiments, the at least one speed sensor need not be a true wheel speed sensor. For example, in some electric vehicles, the at least one speed sensor can be mounted to a tailshaft extension housing and configured with a self-contained tone ring and sensor. Though this embodiment does not provide direct sensing of wheel speed (as each wheel in an axle with a differential is able to turn at differing speeds, and neither is solely dependent on the driveshaft for its final speed), under typical driving conditions, this sensing of speed is close enough to provide a speedometer signal for the vehicle, if desired.

In some embodiments, an energy storage module 106, operatively coupled to the at least one speed sensor, is configured for storing at least a portion of the electrical power generated by the at least one speed sensor. At least a portion of the electrical power stored in the energy storage module 106 can be used to power the electric vehicle. The energy storage module 106 stores electrical energy for use at a later time, and may be used to provide a substantially stable and continuous supply of electrical power, regardless of the supply source status. In some embodiments, the energy storage module 106 may include any of a fuel cell, a rechargeable battery, a supercapacitor, an inductor, or any of various combinations thereof. The energy storage module 106 may also provide voltage regulation of direct current (DC) and/or alternating current (AC) power, as well as frequency regulation of AC power. In a further embodiment, the energy storage module 106 may provide a voltage conversion function to convert a first AC voltage to a second AC voltage greater than or less than the first AC voltage. In some embodiments, the energy storage module 106 may include one or more rectifiers, inverters, and/or voltage converters. For example, the one or more rectifiers may rectify an AC signal, such as the output signal produced by the at least one speed sensor, to provide DC power. The DC power can be used by a charger 107 to charge a battery 108 of the electric vehicle.

In some embodiments, the energy storage module 106 increases the maximum distance range of the electric vehicle, increasing this distance beyond that which is achievable using the battery 108 alone. In some embodiments, electrical energy gathered from the first, second, third and fourth speed sensors 101, 102, 103, and 104 is stored in the energy storage module 106, and the stored energy is fed to the charger 107 to charge the battery 108 while the electric vehicle is in transit to a destination. In other embodiments, the charger 107 charges the battery 108 with stored energy from the energy storage module 106 in response to a voltage of the battery 108 dropping below a threshold.

Figure 2:
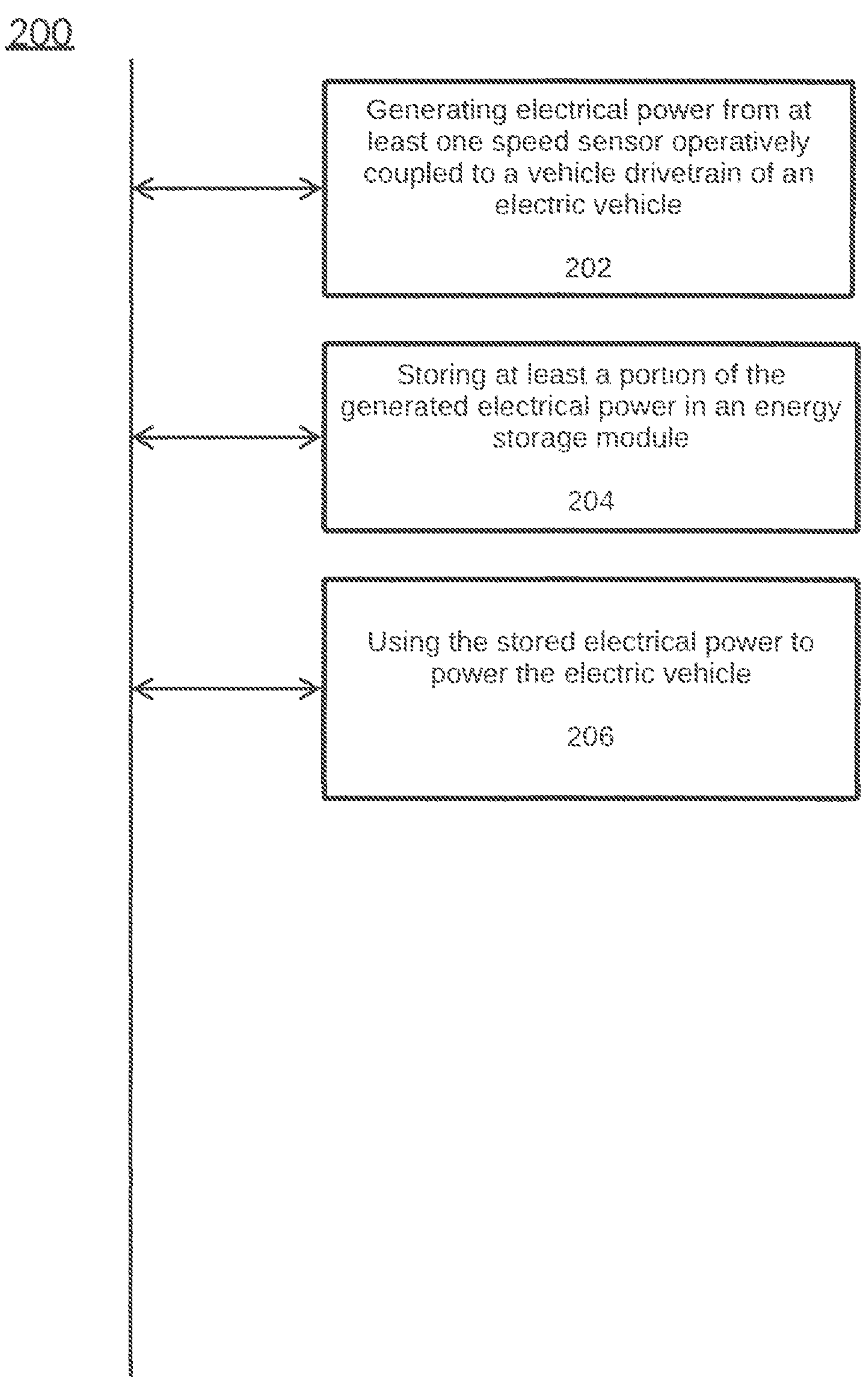
FIG. 2 illustrates a flow diagram, according to example embodiments.

FIG. 2 illustrates a flow diagram 200, according to a set of example embodiments.

Referring to FIG. 2, the flow comprises generating electrical power from at least one speed sensor operatively coupled to a vehicle drivetrain of an electric vehicle 202, storing at least a portion of the generated electrical power in an energy storage module 204, and using the stored electrical power to power the electric vehicle 206.

The diagrams depicted herein, such as FIG. 1 and FIG. 2, are separate examples but may be the same or different embodiments. Any of the operations in one flow diagram could be adopted and shared with another flow diagram. No example operation is intended to limit the subject matter of any embodiment or corresponding claim.

It is important to note that all the flow diagrams and corresponding processes derived from FIG. 1 and FIG. 2, may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although an exemplary embodiment of at least one of a system, method, and apparatus has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that when joined logically together, comprise the module and achieve the stated purpose for the module. Further, modules may be stored on a computer-readable medium, which may be, for instance, a hard disk drive, flash device, random access memory (RAM), tape, or any other such medium used to store data.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system comprising:

a battery configured to power an electric vehicle;

a charger configured to charge the battery;

at least one speed sensor for generating electrical power, wherein the at least one speed sensor is operatively coupled to a vehicle drivetrain of the electric vehicle; and an energy storage module, operatively coupled to the at least one speed sensor, for storing at least a portion of the electrical power generated by the at least one speed sensor; wherein the at least a portion of the electrical power is fed to the charger in order to charge the battery used to power the electric vehicle when a voltage of the battery drops below a threshold.

2. The system of claim 1, wherein the at least one speed sensor comprises a ferromagnetic toothed reluctor ring.

3. The system of claim 2, wherein the reluctor ring comprises an open-air design fabricated of steel.

4. The system of claim 2, wherein the reluctor ring comprises a sealed design using a unitized bearing assembly.

5. The system of claim 2, wherein the toothed reluctor ring includes a number of teeth determined as a function of a first sensing accuracy at a first speed, and a second sensing accuracy at a second speed higher than the first speed.

6. The system of claim 2, wherein the toothed reluctor ring includes a plurality of asymmetrically-shaped teeth to allow the at least one speed sensor to distinguish between a forward rotation and a reverse rotation of the toothed reluctor ring.

7. The system of claim 1, wherein the at least one speed sensor comprises a passive sensor with a ferromagnetic rod oriented to project radially from the toothed reluctor ring, with a permanent magnet at an opposite end of the rod, wherein the rod is wound with wire to form one or more coils, wherein the one or more coils are configured to experience an induced alternating voltage as the reluctor ring rotates, and wherein the toothed reluctor ring is configured to periodically interfering with a magnetic field produced by the permanent magnet as the reluctor ring rotates.

8. The system of claim 1, wherein the at least one speed sensor comprises a passive sensor for outputting electrical power in the form of a sinusoidal output signal which increases in magnitude and frequency when a speed of the toothed reluctor ring increases.

9. The system of claim 1, wherein the at least one speed sensor comprises a passive sensor using a toothed reluctor ring that includes a plurality of alternating magnetic poles to produce an alternating output voltage.

10. The system of claim 1, wherein the at least one speed sensor comprises an active sensor with an output signal conditioning circuit for amplifying a magnitude of an output signal produced by the active sensor.

11. The system of claim 1, wherein the at least one speed sensor comprises an active sensor with an output signal conditioning circuit for changing the output signal to one or more of: a series of pulses, a square wave, and/or a waveform that substantially complies with a communications protocol.

12. The system of claim 1, wherein the energy storage module comprises any of a fuel cell, a supercapacitor, an inductor, or any of various combinations thereof.

13. A method, comprising:

generating electrical power from at least one speed sensor operatively coupled to a vehicle drivetrain of an electric vehicle;

storing at least a portion of the generated electrical power in an energy storage module; and feeding the stored electrical power to a charger of the electric vehicle in order to charge a battery used to power the electric vehicle when a voltage of the battery drops below a threshold.

14. The method of claim 13, further comprising providing the at least one speed sensor using a ferromagnetic toothed reluctor ring.

15. The method of claim 14, further comprising providing the reluctor ring as an open-air design fabricated of steel.

16. The method of claim 14, further comprising providing the reluctor ring as a sealed design using a unitized bearing assembly.

17. The method of claim 14, further comprising determining a number of teeth on the toothed reluctor ring as a function of a first sensing accuracy at a first speed, and a second sensing accuracy at a second speed higher than the first speed.

18. The method of claim 14, further comprising configuring the toothed reluctor ring with a plurality of asymmetrically-shaped teeth to allow the speed sensor to distinguish between a forward rotation and a reverse rotation of the toothed reluctor ring.

19. The method of claim 13, further comprising configuring the at least one speed sensor as a passive sensor comprising a ferromagnetic rod oriented to project radially from the toothed reluctor ring, with a permanent magnet at an opposite end of the rod, wherein the rod is wound with wire to form one or more coils, wherein the one or more coils are configured to experience an induced alternating voltage as the toothed reluctor ring rotates, such that the toothed reluctor ring periodically interferes with a magnetic field produced by the permanent magnets the toothed reluctor ring rotates.

20. The method of claim 13, further comprising configuring the at least one speed sensor as a passive sensor for outputting electrical power in the form of a sinusoidal output signal which increases in magnitude and frequency when a speed of the toothed reluctor ring increases.

21. The method of claim 13, further comprising configuring the at least one speed sensor as a passive sensor using a toothed reluctor ring that includes a plurality of alternating magnetic poles to produce an alternating output voltage.

22. The method of claim 13, further comprising providing the at least one speed sensor as an active sensor with an output signal conditioning circuit for amplifying a magnitude of an output signal produced by the active sensor.

23. The method of claim 13, further comprising providing the at least one speed sensor as an active sensor with an output signal conditioning circuit for changing the output signal to one or more of: a series of pulses, a square wave, and/or a waveform that substantially complies with a communications protocol.

24. The method of claim 13, further comprising providing the energy storage module using any of a fuel cell, a supercapacitor, an inductor, or any of various combinations thereof.

* * * * *